C. H. HILL.
BAND CUTTER AND FEEDER.
APPLICATION FILED JAN. 21, 1919.

1,350,802.

Patented Aug. 24, 1920.
2 SHEETS—SHEET 1.

WITNESSES.

INVENTOR
CHAUNCY H. HILL.
BY
HIS ATTORNEYS

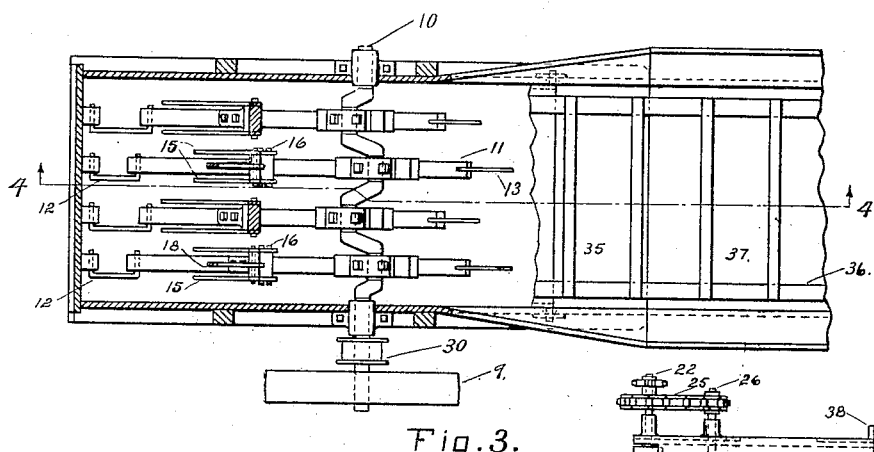
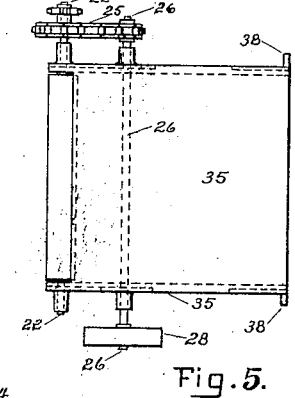
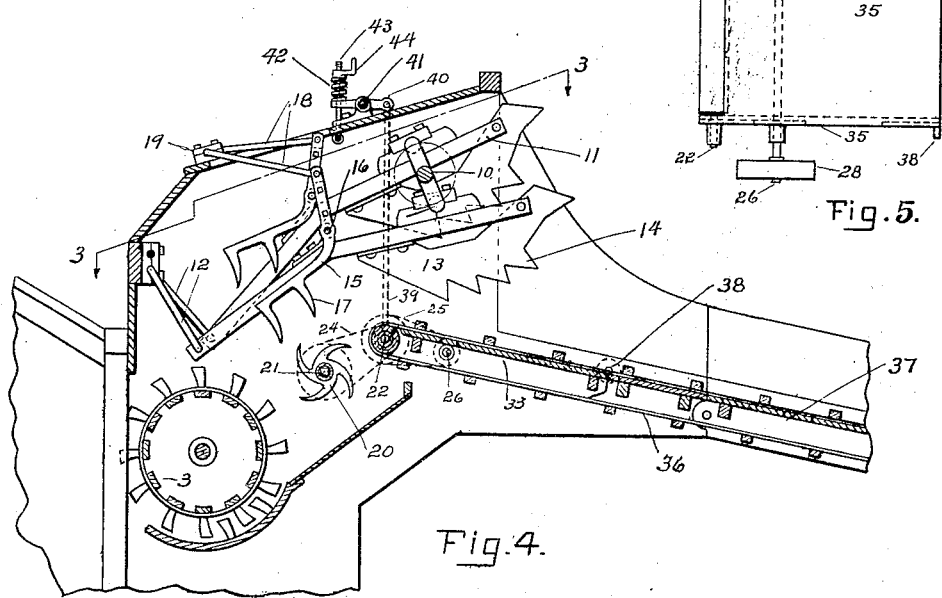

UNITED STATES PATENT OFFICE.

CHAUNCY H. HILL, OF HOPKINS, MINNESOTA, ASSIGNOR OF ONE-HALF TO MINNEAPOLIS THRESHING MACHINE CO., OF HOPKINS, MINNESOTA, A CORPORATION.

BAND-CUTTER AND FEEDER.

1,350,802.  Specification of Letters Patent.  Patented Aug. 24, 1920.

Application filed January 21, 1919. Serial No. 272,228.

*To all whom it may concern:*

Be it known that I, CHAUNCY H. HILL, a citizen of the United States, resident of Hopkins, county of Hennepin, State of Minnesota, have invented certain new and useful Improvements in Band-Cutters and Feeders, of which the following is a specification.

The object of my invention is to provide a band cutter and feeder in which the feed of the grain is regulated by its condition and clogging is prevented. If the grain is light and dry, it will pass rapidly through the feeder to the threshing cylinder, but if wet and heavy or tough, the feed will be retarded to such an extent that the separation and desired thinning out of the bundles will be accomplished and if the grain is extremely heavy or bunched, the feed will be temporarily checked. I am thus able to put the bundles in better shape for threshing and avoid damage to the machine and delays in operation through clogging of the feeder or the thresher with the tough bundles.

A further object is to provide an apparatus for feeding loose grain and regulating the rapidity of such feed according to the condition of the straw.

The invention consists generally in various constructions and combinations, all as hereinafter described and particularly pointed out in the claims.

Figure 1:
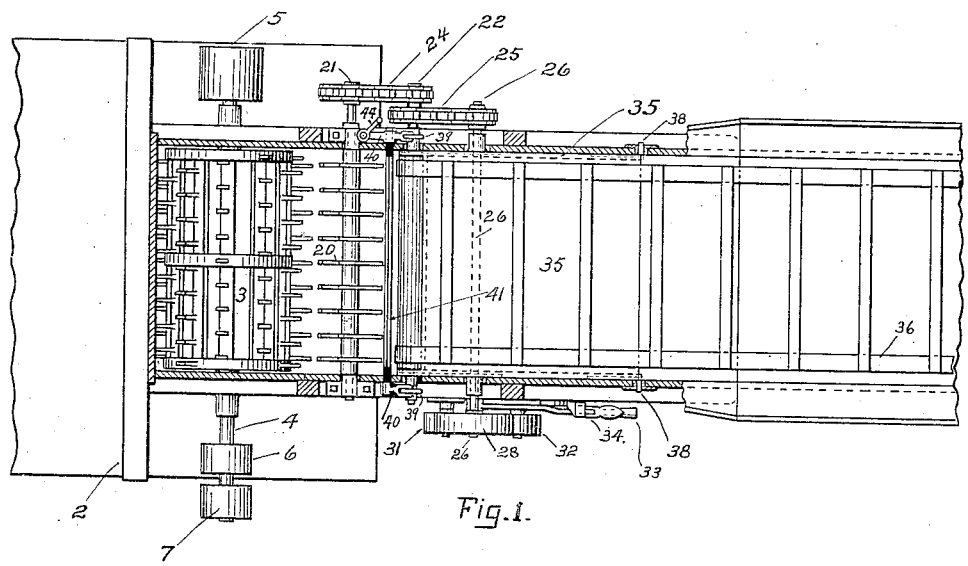
Figure 2:
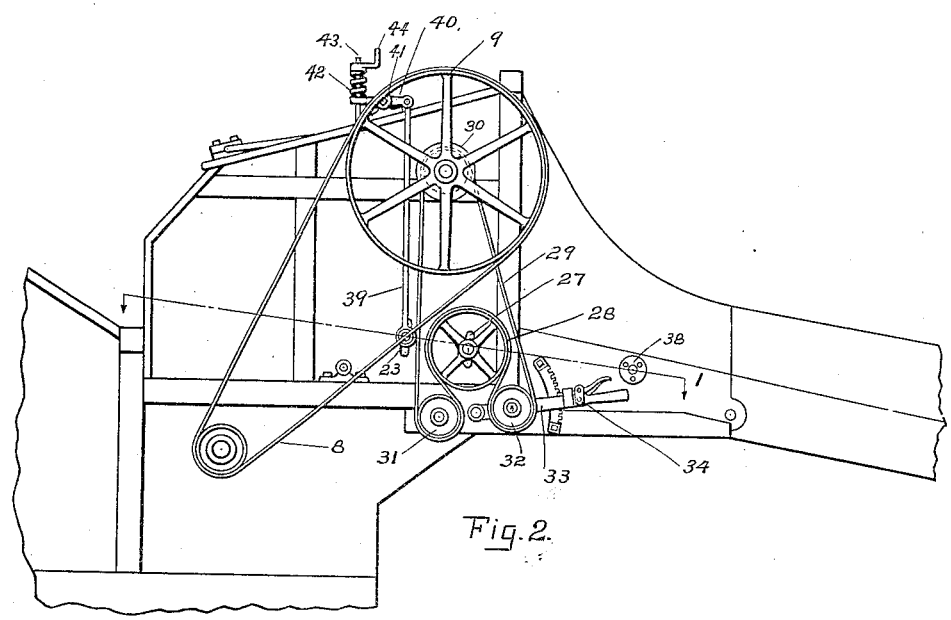

In the accompanying drawings forming part of this specification,

Figure 1 is a plan sectional view of a band cutter and feeder embodying my invention, taken on the section line 1—1 of Fig. 2, Fig. 2 is a side elevation of the same, Fig. 3 is a sectional view on the line 3—3 of Fig. 4, Fig. 4 is a sectional view on the line 4—4 of Fig. 3, Fig. 5 is a detailed view, showing the adjustable section of the feed apron removed from the machine.

In the drawing, 2 represents the frame or casing of the thresher, of any ordinary or suitable construction. 3 is the threshing cylinder, having a shaft 4 provided with a pulley 5 which has driving connection with suitable source of power (not shown). 6 and 7 are pulleys mounted on the shaft 4, from one which the separating mechanism of the machine (not shown) is operated, and the other pulley has a belt connection 8 with a comparatively large pulley 9 mounted on the multiple crank shaft 10. 11 represents a series of bars mounted on the crank shaft in parallel relation and having inwardly and downwardly turned ends pivotally connected with the frame of the machine by suitable means, such as links 12. The revolution of the crank shaft imparts a gyrating movement to these bars.

13 represents a series of blades secured to the bars and depending therefrom, said blades being preferably made of steel plate, of suitable gage, and having in their lower edge a series of band cutting teeth 14 which project downwardly and forwardly to engage and sever the bands of the bound bundles of grain. Arms 15 are pivoted at 16 on the bars 11 and have fingers 17 which depend below the inner ends of said bars. The bars 15 extend above their pivots and links 18 pivotally connect said arms with the feeder casing at 19 so that when the bars 11 are gyrated by the movement of the crank shaft the arms 15 will be moved also and will oscillate in a vertical plane on their pivots on the bars 11 and the fingers 17, engaging the upper portion of the bundle, will feed it toward the threshing cylinder, spreading the grain in a thin stream while the lower portion thereof is held back or retarded by a series of retarding wheels 20 mounted on a shaft 21 beneath the fingers 17 and coöperating therewith to spread and thin out the bundles of grain received from the band cutters.

A shaft 22 is journaled in bearings in the apron frame and has freedom of vertical movement in slots 23 in said casing. A belt 24 connects the shaft 22 with the shaft 21 and a similar driving belt 25 connects the shaft 22 with a shaft 26 which also has bearings in the apron frame and is free to move slidably in slots 27 in said feeder casing. A pulley 28 is mounted on this shaft and a driving belt 29 extends from the flanged pulley 30 on the crank shaft 10 around idle pulleys 31 and 32, the latter being mounted on a belt tightening lever 33 having a locking device 34, said tightening lever operating to increase or decrease the tension of the belt 29, as desired. The shaft 26 passes through the frame 35 of the carrier apron 36. The main portion 37 of the apron frame is normally stationary, but the section 35 therof is hinged at 38 and is free to oscillate, being normally held in alinement with the main portion of the frame by rods 39 which are mounted on the bearing boxes of the shaft 22 and are pivotally connected to lever-arms 40 which are keyed to the shaft 41 on the top of the feeder casing. One of said arms bears on a helical spring 42 carried by a rod 43 and seated against a nut 44 mounted on the rod and having a handle for adjustment thereon to increase or decrease the tension of said spring. I have found it sufficient to provide one compression spring for a rod 43, the lever 40 being forked at one end to straddle this rod and bear on the lower end of the spring while at the other end the forked end of the lever is omitted. Both levers will be rocked simultaneously through the shaft 41 on which they are secured.

The carrier apron will be normally held in its raised position but when a bundle of wet or damp grain is engaged by the band cutters and the feeding speed should be reduced to allow for the proper separation of the grain and prevent bunching and clogging, the pressure between the band cutters and the apron will force the hinged section of the apron frame downwardly so that the pulley 28 will release its pressure on the drive belt, allowing this belt to slip on the pulley or as it usually does on the pulley 30, the edges of this pulley being preferably flanged to prevent the belt from running off at such a time. As soon as the downward pressure on the hinged section of the apron is released, the spring 42 will raise the apron to its normal feeding position and the feeding speed of the apron will be resumed and continued until sufficient downward pressure is again exerted on the apron beneath the band cutters to force the apron down and temporarily check the feed of the grain.

In the operation of the machine, the bundles of grain, if dry, and in favorable condition for threshing, will pass under the band cutters and be spread out or thinned before delivery to the threshing cylinder. If, however, the bundles are wet or if for any reason bundles accumulate beneath the band cutting or feeding mechanism, tending to clog the machine, the upper portion of the apron will be forced downwardly so the drive belt will slip and the feed be temporarily arrested and be automatically resumed when the clogging has been eliminated or when the normal rate of feed is reestablished. I am thus able to insure proper separation of the grain under all conditions, thereby providing for better threshing and also insuring the feeding mechanism against breakage or other damage which is liable to arise when the grain becomes clogged therein.

The belt tightening device 33, in addition to its function of taking up the slack in the belt, is preferably set so that it will pull the carrier section down to a point where the roller shaft in the carrier will not contact with the upper part of the slot in the frame of the feeder and in this position the desired tension of the belt will be maintained by the spring and varied according to the thrust or pressure of the knives on the grain. This tightening device also provides for a range of several inches higher or lower in the mounting of the band cutter shaft in the casing.

I have shown and described my invention in connection with the band cutting knives and referred to the grain as delivered in bound bundles to these knives. I do not wish, however, to be confined to such use, as the apparatus may be successfully used in handling loose grain and preventing clogging of the machine when such loose grain is damp or the stalks tough or when for any other reason it tends to bunch up and prevent the proper feeding function of the mechanism for delivering such grain to the threshing cylinder.

The arms 15, as shown in Fig. 3, are of double or duplicate construction, one on each side of the bars 11. This is important, as the wear on the pivot will then be evenly distributed and the use of the two arms provides a double set of teeth 17, placed side by side, a construction which causes the device to more firmly engage the grain and exert a uniform inward pressure thereon.

I claim as my invention:

1. A grain feeding apparatus comprising a casing, band cutters mounted therein, an apron frame, an apron operating therein to deliver the bundles of grain to said band cutters, said apron frame having a section hinged to the inner end thereof forming an extension of the main portion of said frame, and over which extension said apron moves, said hinged portion being free to oscillate vertically and extending beneath and terminating near said band cutters to be depressed out of alinement with the main portion of said frame with the portion of the apron on said extension by the pressure of the bundles engaging the band cutters, and means for yieldingly resisting the depression of said apron frame extension.

2. A grain feeding apparatus comprising a casing, band cutters mounted therein, an apron frame, an apron operating therein to deliver the bundles of grain to said band cutters, said apron frame having a hinged end portion forming an extension of the main portion of said frame and over which extension said apron passes, said hinged portion being free to oscillate vertically and extending beneath and terminating near said band cutters to be depressed by the pressure of the bundles, and means for yieldingly resisting the depression of said apron frame and extension, a driving mechanism for said apron including means for temporarily checking the movement of said apron when the pressure on said hinged extension exceeds a predetermined degree.

3. A band cutter and feeder comprising a casing, band cutting knives mounted therein, a feed apron and frame therefor, said frame having a pivoted section forming a longitudinal extension thereof and over which extension said feed apron passes to a point beneath and terminating near said knives, said extension being depressed by the pressure of the bundles thereon beneath said band cutting knives, a shaft mounted in said extension and around which said apron passes, rods connected with the ends of said shaft, a shaft mounted to rock on the upper portion of said casing, arms mounted on said rock shaft and connected with said rods, and means for yieldingly resisting the rocking of said shaft and arms.

4. The combination, with a casing, of a plurality of gyrating band cutter-bars mounted therein, a series of arms pivotally supported on the middle portion of said bars and having upper ends projecting above said bars, links pivotally connecting said upper ends with the upper portion of said casing, the lower portion of said arms being inwardly and downwardly curved and having depending members, the longitudinal movement of said bars imparting a comparatively rapid vertical movement to said members and a forward and backward stroke of greater length than the stroke of said bars.

5. The combination, with a casing, of a crank shaft journaled therein, bars mounted near one end on said crank shaft and having downwardly curved inner portions, band cutting knives mounted on the outer portions of said bars, links pivotally connecting the inner portions of said bars with said casing, a series of curved arms pivoted at points intermediate to their ends on the middle portions of said bars, links pivotally connecting the upper portions of said arms with said casing, the lower portions of said arms being inwardly and downwardly curved and provided with depending members, the movement of said arms on said bars imparting a greater forward and backward movement to said members than the stroke of said bars.

6. The combination, with a casing, of a crank shaft journaled therein, bars journaled near their outer ends on said crank shaft and having a plurality of band cutting knives, the inner portions of said bars being downwardly turned, links pivotally connecting them with said casing, arms mounted in pairs on the middle portions of said bars, one arm of each pair being on one side of a bar and the other arm of the same pair on the opposite side of the bar, said arms being inwardly and downwardly curved and having members depending below said bars and means pivotally connecting said arms with the upper portion of said casing.

7. A band cutter and feeder comprising a casing, band cutting knives mounted therein, a feed apron and frame therefor, said frame having a pivoted upper section forming a longitudinal extension thereof and over which extension said feed apron passes to a point beneath and terminating near said knives, said extension being depressed by the pressure of the bundles thereon, a shaft mounted in said extension and around which said apron passes and having ends projecting through guides in the wall of said casing and vertically movable therein, rods connected with the ends of said shaft, a shaft mounted to rock in bearings on the top of said casing, arms mounted on said rock shaft and connected with said rods, and means for yieldingly resisting the rocking of said shaft and arms.

8. The combination, with a casing, and band cutters mounted therein, of an apron frame having a pivoted extension at its inner end projecting under said band cutters, a bundle feeding apron movable over said frame and said extension, a roller mounted at the inner end of said extension and around which said apron passes, arms pivotally supported at points intermediate to their ends on the top of said casing, rods connecting one end of said arms with said roller, one of said rods having a forked end, an upright rod mounted on said casing and straddled by said forked end, and a spring carried by said upright rod to be compressed by the downward movement of said roller and the oscillation of said forked arm.

9. A band cutter and feeder comprising a casing and band cutting knives mounted therein, an apron frame having a hinged extension at its inner end, an apron mounted in said frame and passing over said hinged extension, a shaft mounted in said extension and over which said apron passes, a second shaft mounted in said extension and having a driving connection with said first named shaft, a pulley mounted on said second shaft, idle pulleys mounted on said casing below said first named pulley upon each side thereof, a drive belt passing under said idle pulleys and over said first named pulley, depression of said apron frame extension moving said first named pulley out of driving engagement with said belt and means for yieldingly resisting downward movement of said shafts and pulley and said extension.

10. A band cutter and feeder comprising a casing, a crank shaft mounted therein, bars mounted near one end on said crank shaft and having band cutting knives, the other ends of said bars having pivotal connections with said casing and a series of arms pivotally supported on said bars near the middle portions thereof and having their upper ends pivotally connected with said casing and their lower ends porvided with depending fingers in the rear of said band cutting knives.

11. A band cutter and feeder comprising a casing, a crank shaft journaled therein, bars journaled near one end of said crank shaft, and pivotally connected at their outer ends with said casing, band cutting knives carried by said bars near said crank shaft, arms pivotally supported intermediate to their ends on said bars between said knives and the pivotal connection of said bars on said casing, links pivotally connecting the upper ends of said arms with said casing, the lower portions of said arms being inwardly and downwardly curved and having fingers depending below said bars, said fingers having a greater and more rapid vertical movement than their pivots on said bars and also having a greater forward and backward movement than said bars.

In witness whereof, I have hereunto set my hand this 14" day of January 1919.

CHAUNCY H. HILL.